Apr. 17, 1923.  1,452,188
B. F. CHRIST
LIFTER BLOCK FOR MOTOR VEHICLES
Filed Oct. 22, 1921   2 Sheets-Sheet 1

WITNESSES
George G. Mefs.

INVENTOR
B. F. CHRIST,
BY
Munn & Co.
ATTORNEYS

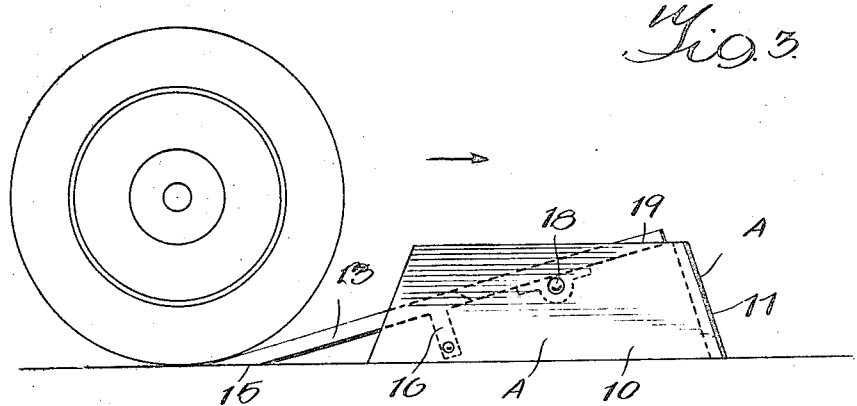
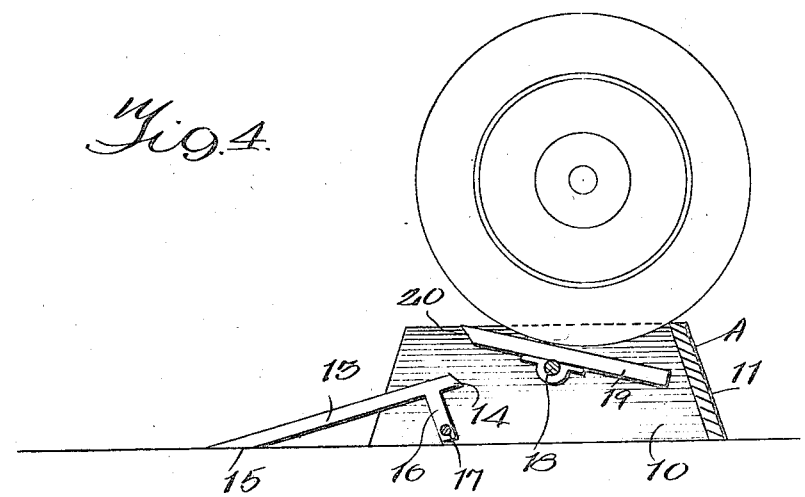
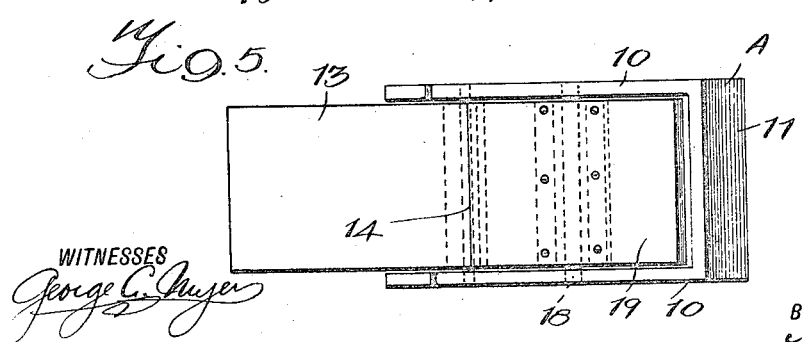

Patented Apr. 17, 1923.

1,452,188

UNITED STATES PATENT OFFICE.

BENJAMIN F. CHRIST, OF IDA GROVE, IOWA.

LIFTER BLOCK FOR MOTOR VEHICLES.

Application filed October 22, 1921. Serial No. 509,619.

*To all whom it may concern:*

Be it known that I, BENJAMIN F. CHRIST, a citizen of the United States, and a resident of Ida Grove, in the county of Ida and State of Iowa, have invented certain new and useful Improvements in Lifter Blocks for Motor Vehicles, of which the following is a specification.

This invention relates to lifter blocks for motor vehicles.

The object of the invention is to provide a device of the above character which is adapted to be placed ahead of a motor vehicle wheel, or the like, and permit easy rotation of the wheel thereon for elevating the same.

It is also an object of the invention that upon a wheel being disposed upon the block that means will automatically operate for holding the wheel against movement.

A further object of the invention is that the lifter block be durable in construction and inexpensive to manufacture.

Other objects and objects relating to details of construction, combination and arrangement of parts will hereinafter appear in the detailed description to follow.

The invention is illustrated by way of example in the accompanying drawings, in which:—

Figure 1:
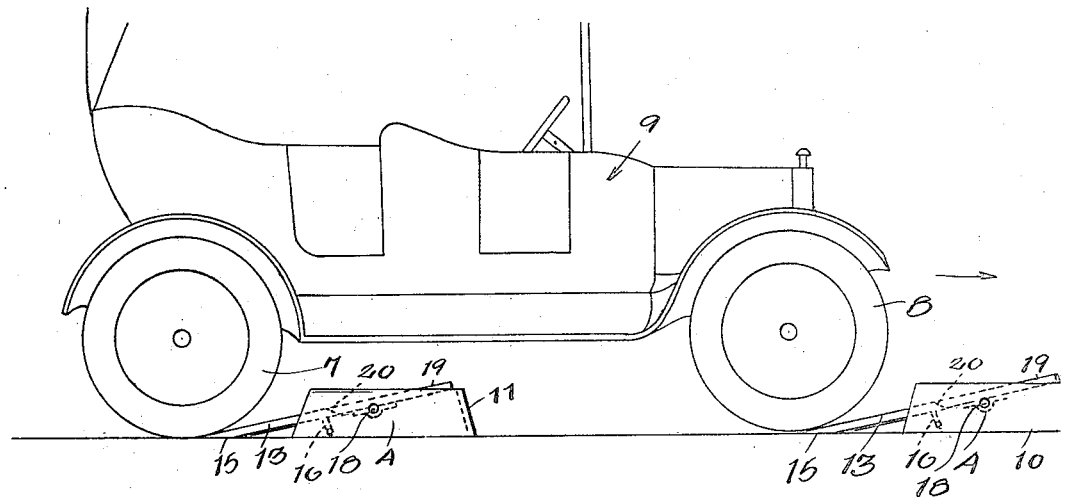
Figure 2:
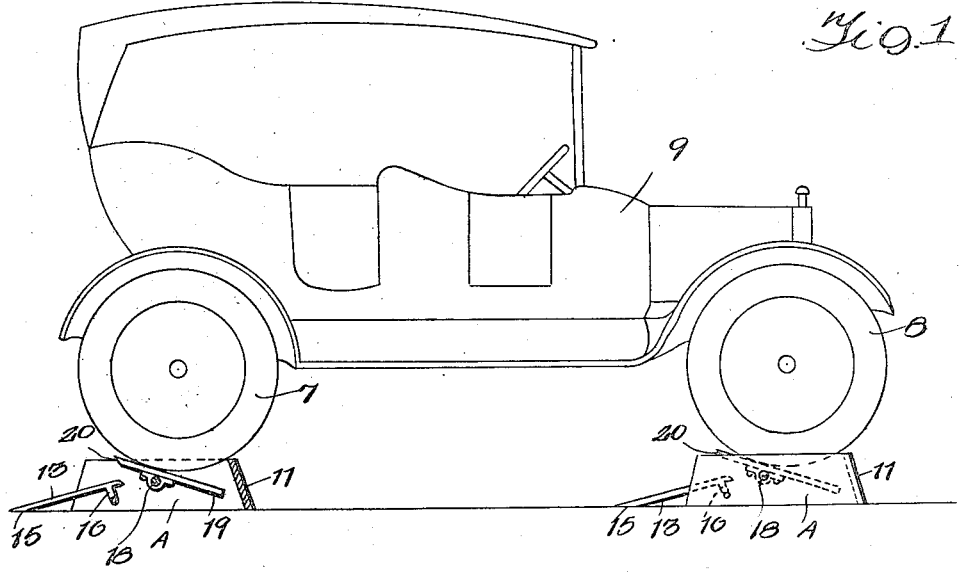

Figure 1 is a view in side elevation illustrating the application of the lifter blocks to an automobile previous to elevating the same, Figure 2 is a view similar to Figure 1, but illustrating automobile elevated, Figure 3 is a view in side elevation of a single block and particularly illustrating the manner in which the same is positioned with respect to a wheel for elevating the same, Figure 4 is a view similar to Figure 3 but showing the wheel elevated, Figure 5 is a top plan view of a lifter block.

Referring to the drawings more particularly, the lifter block comprises a box structure generally designated by the reference character A, which comprises a pair of side walls 10 and an end wall 11. The sides 12 preferably have their end edges cut so that the same converge upwardly, as shown, and between the free ends of the side walls 12 there is a platform 13 which is substantially equal in width to the distance between the side walls 12; and which has its forward end beveled as at 14 and its rear end cut on an incline as at 15. Adjacent the forward end of the platform there is formed a downwardly extending member 16 through which there passes a pin 17, said pin having its ends journaled in the sides 12 and pivotally supporting the one end of the platform 13. Forward to the platform there extends between the side walls 12 a rod 18, said rod being positioned centrally of the ends of the side walls 12, as shown, and pivotally support a second platform 19, a strap bearing 20 being preferably used for pivoting the platform 19. The rear end of the platform 19 is beveled as at 20, said bevel being opposite to the beveled end 14 of the platform 13.

Referring to Figure 2, 9 indicates generally an automobile body, 8 the front wheels thereof and 7 the rear wheels. As shown in Figure 2 a block A has been positioned forward each of the wheels 7 and 8 and the platform 13 of each block disposed so that the associated automobile wheel will thread thereon with the forward movement of the automobile. In Figure 2 the automobile is shown as supported in an elevated position by the blocks A. The platforms 19 are shown as tilted forwardly and serving to hold the wheels against backward rotative movement, while the end wall 11 in each instance serves to hold the associated wheel against forward rotative movement. The platforms 19 of course tilts forwardly as shown in Figure 2 upon the wheel of the automobile reaching a predetermined position, in other words, the platforms 19 will tilt forwardly when the wheel upon the same is disposed forward to its pivotal center.

Referring to Figures 3 and 4, 21 indicates an automobile wheel. The operation of the platforms 13 and 19 for elevating the wheel 21 is the same as described for elevating the automobile shown in Figures 1 and 2.

It is of course apparent that when it is desired to lower the automobile from the blocks it will only be necessary to run the automobile backwards under its own power and in this way the platforms 19 will be caused to tilt to their initial position, shown in Figure 1, and thus permitting the automobile to be lowered in an easy manner and without shock.

I claim:

1. A device of the character described, comprising a block adapted for facilitating the rolling of a wheel thereon, a tiltable platform associated therewith, adapted when said wheel has reached the forward end of the block to tilt forwardly and hold the wheel against return movement, and means whereby the wheel will be held against forward movement.

2. A device of the character described, comprising a block adapted for facilitating the rolling of a wheel thereon, a forwardly tiltable platform associated therewith, adapted when said wheel has reached the forward end of the block to tilt forwardly and hold the wheel against return movement, and said block having a forward end wall adapted to hold a wheel against forward movement.

3. A lifter block of the character described, comprising a box structure including a pair of side walls and end wall, an inclined wheel runner between the free ends of the side walls, and a second platform forward to the first platform and adapted for forward tilting movement.

4. A lifter block of the character described, comprising a box structure including a pair of side walls and end wall, an inclined wheel runner between the free ends of the side walls, a second platform forward to the first platform and normally disposed to form a continuation of the incline of the first named platform, and also adapted to tilt forwardly when a weight is disposed thereon off its longitudinal center.

BENJAMIN F. CHRIST.